Oct. 13, 1970   S. C. LEE   3,534,302
TRIANGULAR AND RHOMBOID THIN FILM DISTRIBUTED
RESISTANCE ATTENUATOR
Filed June 12, 1967   15 Sheets-Sheet 1

INVENTOR
S. C. LEE
BY
ATTORNEY $\mathfrak{z}$-PLANE

Z-PLANE

U-PLANE $\mathcal{V}$-PLANE z-PLANE

Z-PLANE u-PLANE

U-PLANE

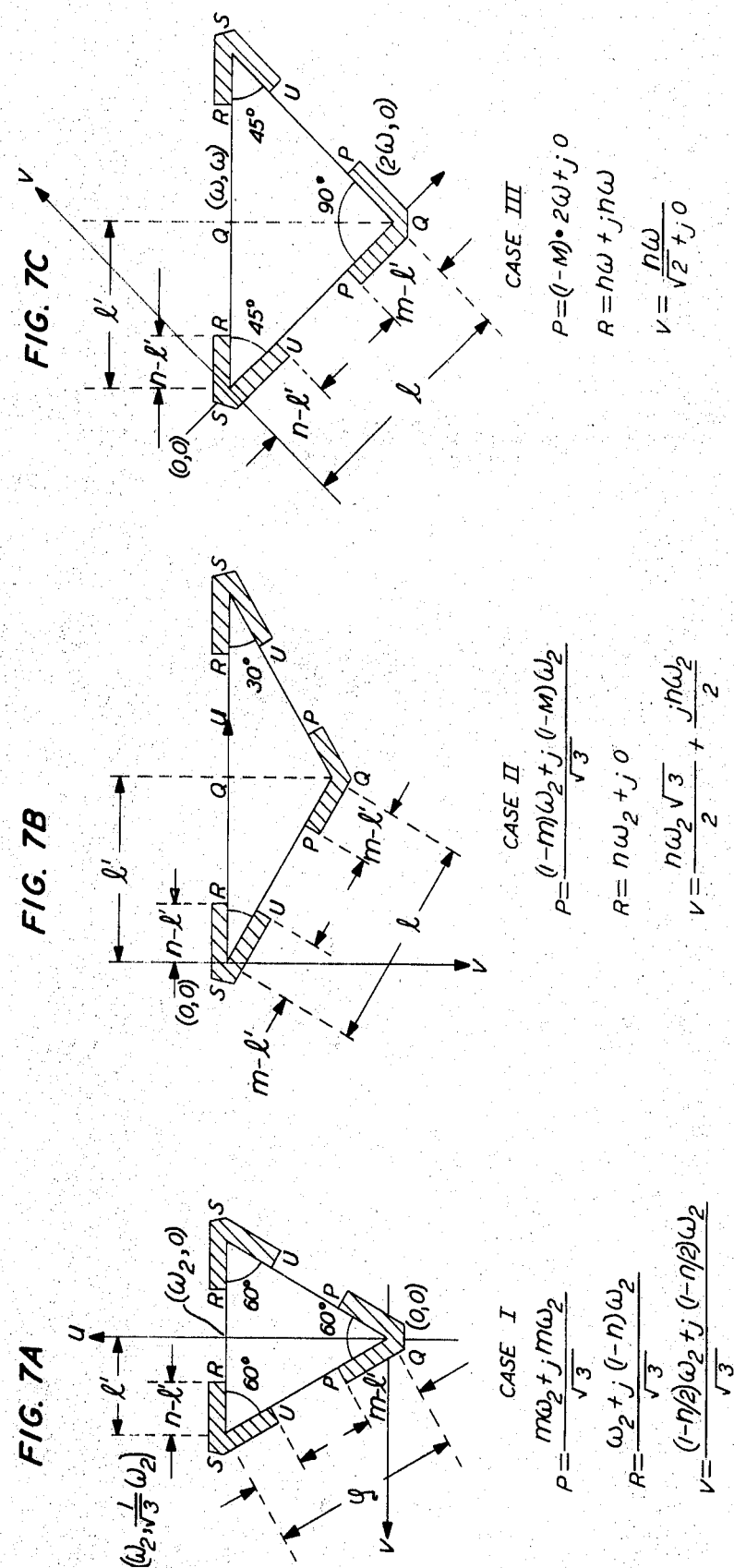

$$R = \frac{2BC}{2B-C} = 146.97$$

FIG. 22

| TYPE OF TRIANGLE | TRANSFORMATION | THE REAL HALF PERIOD $\omega_2$ | ABC IN $\mathfrak{z}$ PLANE | ABC IN $z$ PLANE |
|---|---|---|---|---|
| EQUILATERAL TRIANGLE $\left(\frac{\pi}{3}, \frac{\pi}{3}, \frac{\pi}{3}\right)$ | $z^2 = \frac{1}{1-\rho\mathfrak{z}}$ | $\omega_2 = \frac{1}{6} \cdot \frac{*\Gamma\left(\frac{1}{6}\right)\Gamma\left(\frac{1}{2}\right)}{\Gamma\left(\frac{2}{3}\right)}$ | $b \underset{a(0,0)}{\overset{Y(0,\frac{2}{\sqrt{3}}\omega_2)}{\triangle}} c(\omega_2, \frac{1}{\sqrt{3}}\omega_2) \rightarrow X$ | $\underset{C}{\overset{Y}{\longleftarrow}} \underset{-1}{\overset{0}{\mid}} \underset{A}{\overset{1}{\mid}} \underset{B}{\rightarrow X}$ |
| RIGHT ANGLED TRIANGLE CONTAINING AN ANGLE OF 60° $\left(\frac{\pi}{3}, \frac{\pi}{2}, \frac{\pi}{2}\right)$ | $z = \frac{1-(\rho\mathfrak{z})^3}{1+(\rho\mathfrak{z})^3}$ | $\omega_2 = \frac{1}{6} \cdot \frac{\Gamma\left(\frac{1}{6}\right)\Gamma\left(\frac{1}{2}\right)}{\Gamma\left(\frac{2}{3}\right)}$ | $b(\omega_2, \frac{1}{\sqrt{3}}\omega_2) \quad a(\omega_2, 0) \rightarrow X$ $c(0,0)$ | $\underset{C}{\overset{Y}{\longleftarrow}} \underset{-1}{\overset{0}{\mid}} \underset{A}{\overset{1}{\mid}} \underset{B}{\rightarrow X}$ |
| ISOSCELES TRIANGLE CONTAINING AN ANGLE OF 120° $\left(\frac{2\pi}{3}, \frac{\pi}{6}, \frac{\pi}{6}\right)$ | $z^2 = \frac{(\rho\mathfrak{z})^3}{(\rho\mathfrak{z})^3 - 1}$ | $\omega_2 = \frac{1}{6} \cdot \frac{\Gamma\left(\frac{1}{6}\right)\Gamma\left(\frac{1}{2}\right)}{\Gamma\left(\frac{2}{3}\right)}$ | $a(\omega_2, \frac{1}{\sqrt{3}}\omega_2) \quad c$ $b(0,0) \quad (2\omega_2, 0) \rightarrow X$ | $\underset{C}{\overset{Y}{\longleftarrow}} \underset{-1}{\overset{0}{\mid}} \underset{A}{\overset{1}{\mid}} \underset{B}{\rightarrow X}$ |
| ISOSCELES RIGHT ANGLED TRIANGLE $\left(\frac{\pi}{2}, \frac{\pi}{4}, \frac{\pi}{4}\right)$ | $z = \frac{\rho\mathfrak{z}}{\sqrt{(\rho\mathfrak{z})^2 - 1}}$ | $\omega_2 = \frac{1}{4} \cdot \frac{\Gamma\left(\frac{1}{2}\right)\Gamma\left(\frac{1}{4}\right)}{\Gamma\left(\frac{3}{4}\right)}$ | $a(\omega,\omega)$ $b(0,0) \quad c(2\omega,0) \rightarrow X$ | $\underset{C}{\overset{Y}{\longleftarrow}} \underset{-1}{\overset{0}{\mid}} \underset{A}{\overset{1}{\mid}} \underset{B}{\rightarrow X}$ |

*$\Gamma$ - GAMMA FUNCTION

United States Patent Office 3,534,302
Patented Oct. 13, 1970

3,534,302
TRIANGULAR AND RHOMBOID THIN FILM DISTRIBUTED RESISTANCE ATTENUATOR
Samuel C. Lee, New Providence, N.J., assignor to Bell Telephone Laboratories, Incorporated, Murray Hill and Berkeley Heights, N.J., a corporation of New York
Filed June 12, 1967, Ser. No. 645,269
Int. Cl. H01p 1/22
U.S. Cl. 333—81                     14 Claims

ABSTRACT OF THE DISCLOSURE

A thin film distributed resistance attenuator subject to precise methods of analysis and synthesis is formed by employing any one of a family of basic triangular resistive areas or particular combinations thereof with specifically tailored connecting tabs.

BACKGROUND OF THE INVENTION

Field of the invention

This invention relates to attenuators and more particularly to thin film distributed resistance attenuators and their employment in lieu of equivalent lumped circuit elements.

Description of the prior art

Thin film technology is rapidly becoming one of the basic building blocks of microelectronic circuitry. A part of the impetus for this development stems from the increasing complexity of circuit design and the attendant necessity for simplified circuit interconnections. Thin film circuits not only replace larger and more cumbersome lumped circuit components but also inherently provide interwiring in a small package as a part of the manufacturing process.

The wide acceptance of thin film circuitry can be attributed in part to the development of thin film materials, such as tantalum nitride for example, with highly stable characteristics and to the ability to produce such films in quantity with uniform quality. Despite these developments, however, the apparent potential of thin film circuits has not heretofore been fully realized. Conventional thin film attenuators, for example, are typically rectangular in shape which inherently produces nonuniform current distribution, attendant uneven distribution of heat and resulting adverse effects on reliability. Moreover, the continued pressure toward further reduction in circuit size raises a question as to whether maximum efficiency is being realized in the utilization of substrate areas.

Accordingly, an object of the invention is to enhance the reliability of thin film distributed resistance elements and to increase the efficiency of substrate area utilization.

SUMMARY OF THE INVENTION

The principles of the invention are based in part on the realization that the uniformity of current distribution in a thin film distributed resistance attenuator can be markedly increased if the thin film area is made in a triangular form rather than in the conventional rectangular configuration. In accordance with one aspect of the invention precise methods of both analysis and synthesis have been discovered that are applicable to triangularly shaped networks so long as the triangles are restricted to particular defined class.

The features of the invention are not restricted to attenuators in the form of single triangles only but instead include certain triangle pairs from the classes indicated combined in either a rhomboid or "V" configuration. Insertion loss, transfer function and other transmission characteristics can be precisely tailored in accordance with the principles of the invention by appropriate calculation-based selection of connecting tab size and position, resistive film size and resistivity, and triangle or combination triangle form.

BRIEF DESCRIPTION OF THE DRAWING

FIGS. 7A, 7B and 7C are sketches of triangular networks in accordance with the invention;

FIG. 22 is a table of Schwarz-Christoffel conformal transformations for four selected triangle types.

DETAILED DESCRIPTION

The advantages of employing two-port three-terminal rectangular distributed resistance networks in lieu of lumped resistance networks are well known in the art. The design principles of such circuits are also well known, as indicated for example in a paper, "Design of a Thin Film Attenuator—An Analytical Approach," by J. Robin, published in the Western Electric Company Engineer, vol. 7, April 1963, pp. 18 through 25, and in a paper, "Synthesis of Resistance Networks from Monolithic Conductors by Conformal Transformations," by R. J. Dow, published in The Proceedings of the Electronic Components Conference, Washington, D.C., May 1965.

Figure 1A:
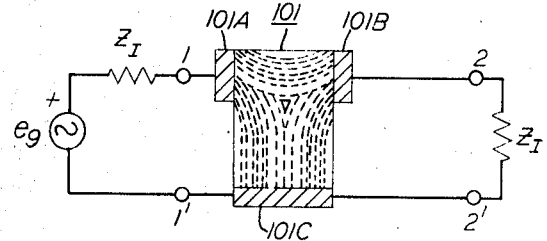
FIGS. 1A and 1B are schematic circuit diagrams of rectangular attenuators in accordance with the prior art showing the distribution of current densities.

FIG. 1 shows an illustrative attenuator 101 of the rectangular type, taught by Dow and Rabin, with connecting terminals or tabs 101A, 101B and 101C connected across circuit terminals 1 and 2 and the common circuit terminals 1' and 2'. Power source $e_g$ and input and output impedances $Z_1$ are included to indicate the general circuit environment in which a distributed resistance attenuator of this type may be employed. Current distribution in the attenuator 101 is illustrated by the broken lines interconnecting the tabs 101A, 101B and 101C.

It may be observed that the current density in the attenuator 101 is greatest in the area near the edges of the rectangle and that current density gradually decreases in the direction of the center of the rectangle. The dotted lines shown on the surface of the attenuator 101 also serve to indicate relative levels of power dissipation, and from these levels it is evident that power dissipation is by no means uniform. Uniform power dissipation is highly desirable in a circuit of this type, however, to ensure operational reliability and stability as well as to ensure maximum efficiency in the use of the substrate area.

Figure 1B:
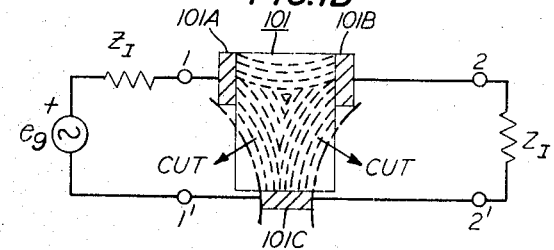
Figure 2:
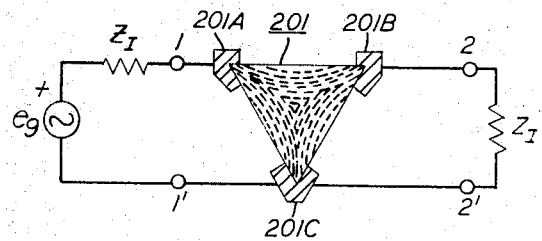
FIG. 2 is a schematic circuit diagram of a triangular attenuator in accordance with the invention showing current density.

If the size of the common tab 101C is reduced, as shown in FIG. 1B, it is found that current density or power dissipation is increased at the center part of the rectangule and is markedly reduced in the lower two corners. This effect may be accentuated further in accordance with the invention by removing both of these lower corners along the "cut" lines of FIG. 1B which results in a network having an essentially triangular rather than a rectangular configuration. If this concept of reducing nonuniform current density areas still further is carried out in accordance with the invention, a completely triangular network 201 of the form shown in FIG. 2 results. The enhancement in the uniformity of current density or power dissipation that characterizes a triangular attenuator as compared to a rectangular attenuator is evident from the current distribution lines shown in the triangular network 201. This uniformity arises in part from having at least a portion of each of the terminal tabs 201A, 201B and 201C placed at or in close proximity to a respective one of the corners of the network so that the geometry of the network with respect to the three terminals is substantially symmetrical.

From the foregoing it is evident that the advantages stemming from increased uniformity in power dissipation in thin film distributed resistance networks may be realized in accordance with the principles of the invention by employing networks that are essentially triangular in form. These advantages, however, are largely theoretical unless it can be shown that triangular networks are subject to both analysis and synthesis by exact computational methods. As shown by the following discussion, precise mathematical calculations can indeed be employed in accordance with the principles of the invention to analyze and synthesize certain selected triangular networks and various combinations thereof.

Analysis and synthesis of triangular networks—mathematical foundation

A Schwarz-Christoffel transformation is a conformal transformation under which a polygon in one plane is mapped into the real axis in a second plane. Schwarz-Christoffel transformation techniques are well known being shown for example in the text, "Advanced Mathematics in Physics and Engineering," by A. Bronwell, McGraw-Hill, New York, 1952, pp. 380–383. A brief review of these techniques provides a useful preface to a complete explanation of the analysis and synthesis of triangular networks in accordance with the invention.

Figure 3A:
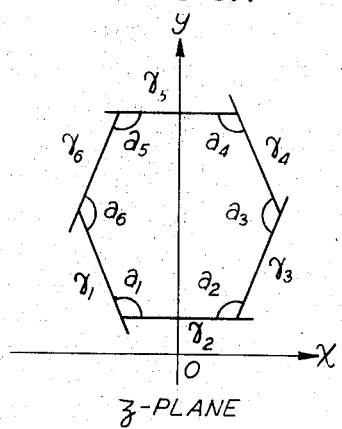
FIG. 3A is a plot of a polygon in the Z-plane.
Figure 3B:
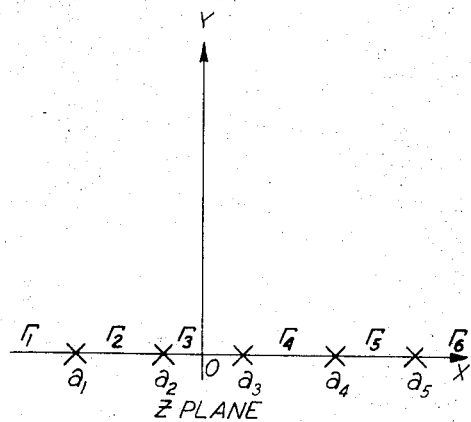
FIG. 3B is the Schwarz-Christoffel transformation of the polygon of FIG. 3A into the Z-plane.

If as shown in FIG. 3A, a polygon with vertices $a_1$ through $a_6$ and sides $\gamma_1$ through $\gamma_6$ is plotted in the z-plane and the z-plane is transformed to the Z-plane as shown in FIG. 3B, the Schwarz-Christoffel equation for the transformation may be expressed as follows:

$$z = k \int \prod_{i=1}^{n} (Z-a_i)^{(\alpha_i/\pi)-1} dZ + C \qquad (1)$$

Figure 4A:
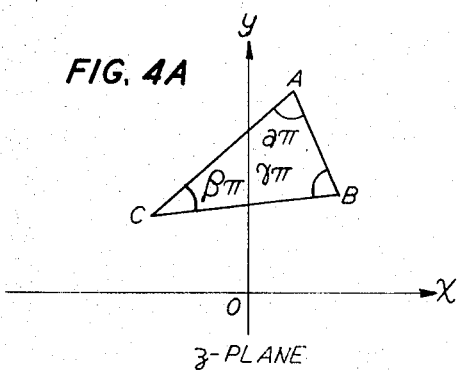
FIG. 4A is a plot of a triangle in the z-plane.
Figure 4B:
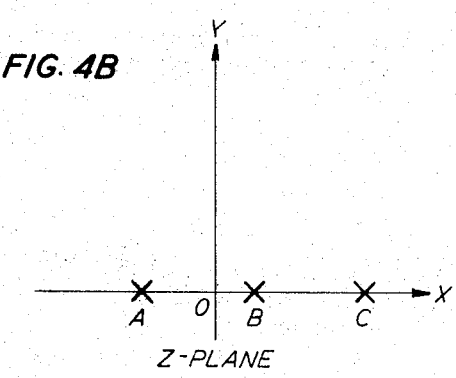
FIG. 4B is the Schwarz-Christoffel transformation of the triangle of FIG. 4A into the Z-plane.

When the polygon is an arbitrary triangle in the z-plane, however, the function Z cannot generally be solved analytically from the integral Equation 1. There are, nevertheless, certain special cases in which Z is an elliptic function $\rho z$ of $z$, where $\rho z$ is termed the Weierstrass elliptic function. In such cases the function $\rho z$ is single-valued at every point in the z-plane. The special cases indicated occur for those triangles with angle combinations corresponding to any one of the following angle groups:

(1) $\left(\dfrac{\pi}{3}, \dfrac{\pi}{3}, \dfrac{\pi}{3}\right)$ (2) $\left(\dfrac{\pi}{2}, \dfrac{\pi}{3}, \dfrac{\pi}{6}\right)$ (3) $\left(\dfrac{2\pi}{3}, \dfrac{\pi}{6}, \dfrac{\pi}{6}\right)$ and (4) $\left(\dfrac{\pi}{2}, \dfrac{\pi}{4}, \dfrac{\pi}{4}\right)$ A summary of Weierstrass' $\rho$-function is found in an article, "Vortex Motion in Certain Triangles," by A. E. H. Love, published in the American Journal of Mathematics, vol. 11, 1889, pp. 158–171. The foregoing relationships may be directly turned to account, in accordance with the principles of the invention, as illustrated by the following example. Let $a$, $b$ and $c$ denote the vertices of a triangle in the z-plane with the corresponding angles designated $\alpha\pi$, $\beta\pi$ and $\gamma\pi$. By transforming the Z-plane as shown in FIG. 4B, points $a$, $b$ and $c$ becomes points A, B and C, respectively, on the real $x$ axis. Equation 1 then becomes $$z = k \int (Z-a)^{\alpha-1}(Z-b)^{\beta-1}(Z-c)^{\gamma-1}dZ + C \qquad (2)$$

Exact solutions of Equation 2 for the four triangular types indicated above are shown in the text, "Jacobian Elliptic Function Tables," by L. M. Milne-Thomson, Dover Publications, Inc., New York, 1950. For convenience, these solutions are reproduced in tabular form in FIG. 22.

Analysis of the triangular network

Figure 5A:
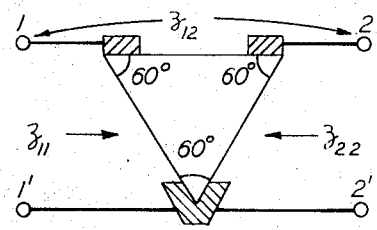
FIG. 5A is a schematic circuit diagram of an equilateral triangle attenuator in accordance with the invention.
Figure 5B:
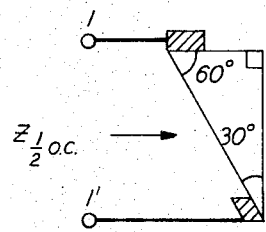
FIG. 5B is a schematic circuit diagram of the open-circuited half of the circuit of FIG. 5A.
Figure 5C:
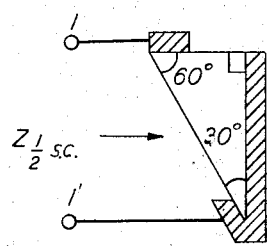
FIG. 5C is a schematic circuit diagram of the short-circuited half of the circuit of FIG. 5A.

Consider now the equilateral triangular network shown in FIG. 5A, a physically symmetrical two-port network. A two-port network is said to be physically symmetrical if it has mirror-image symmetry with respect to a certain line; that is, a line may be found which divides the network into two halves. At this point, in accordance with the invention, Bartlett's bisection theorem is employed. Bartlett's bisection theorem techniques are well known and are described for example in the text, "Principles of Linear Networks," by B. Friedland, O. Wing and R. Ash, McGraw-Hill, New York, 1961, pp. 256–259. The open-circuited half and short-circuited half of the triangular network of FIG. 5A are shown in FIGS. 5B and 5C, respectively. Using Bartlett's bisection theorem, it may be shown that $$Z_{1/2 \text{ o.c.}} = z_{11} + z_{12} \qquad (3)$$

and $$Z_{1/2 \text{ s.c.}} = z_{11} - z_{12} \qquad (4)$$

where $z_{11}(=z_{22})$ and $z_{12}$ are the conventional z-parameters of the attenuator of FIG. 5A, and $Z_{1/2 \text{ o.c.}}$, $Z_{1/2 \text{ s.c.}}$ are the input impedances of the open-circuited half, FIG. 5B, and the short-circuited half, FIG. 5C, respectively. The procedure for determining the value of $Z_{1/2 \text{ o.c.}}$ is substantially identical to the procedure for finding the value of $Z_{1/2 \text{ s.c.}}$ and, accordingly, the procedure for finding $Z_{1/2 \text{ o.s.}}$ only will be described herein as follows. First transform from the z-plane to the Z-plane. From the table of FIG. 22 the applicable Schwarz-Christoffel transformation is found to be $$Z(z) = \frac{1 - (\rho z)^3}{1 + (\rho z)^3} \qquad (5)$$

Figure 6A:
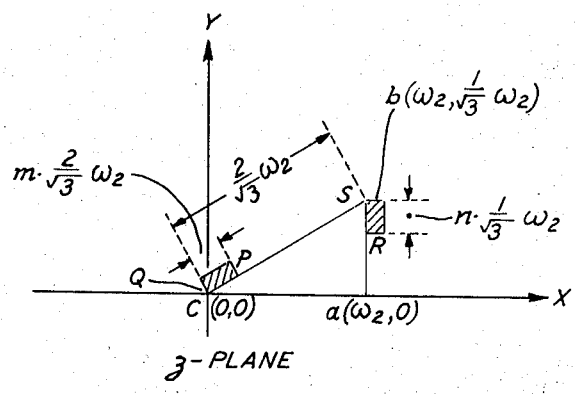
FIGS. 6A through 6D are transformation plots of the circuit of FIG. 5B in the $z$, $Z$, $u$ and $v$ planes respectively.
Figure 6B:
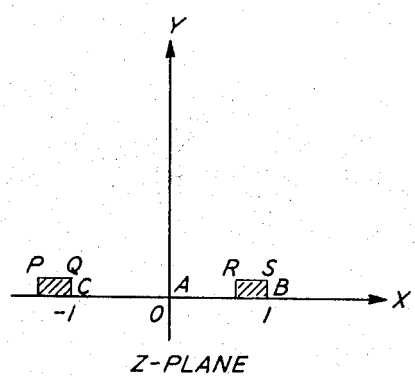
Figure 6C:
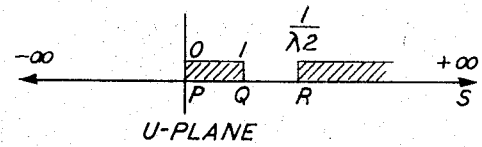
Figure 6D:
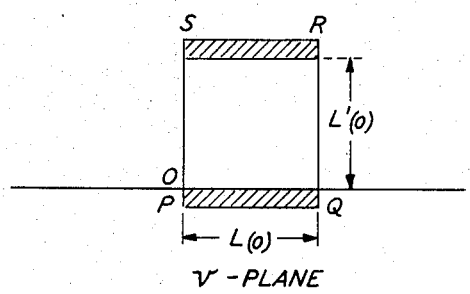
Figure 6E:
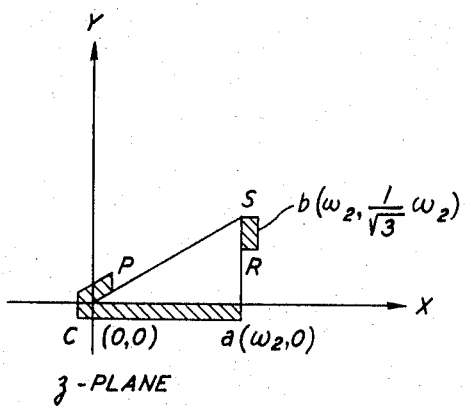
FIGS. 6E through 6H are transformation plots of the circuit of FIG. 5C in the $z$, $Z$, $u$ and $v$ planes respectively.
Figure 6F:
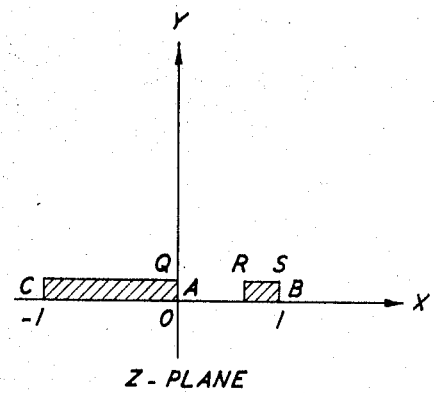

The half circuits of FIGS. 5B and 5C are replotted in FIGS. 6A and 6E, respectively, and are reoriented to the axes indicated. By applying Equation (5), the points P, Q, R and S in the z-plane in FIGS. 6A and 6E are transformed into the Z-plane as shown in FIGS. 6B and 6F. Now let $\alpha$, $\beta$, $\gamma$ and $\delta$ denote the functions Z(P), Z(Q), Z(R) and Z(S), respectively. Next, transform the Z-plane to the u-plane by employing the bilinear conformal transformation, $$u(Z) = \frac{\delta - \beta}{\beta - \alpha} \cdot \frac{Z - \alpha}{\delta - Z} \qquad (6)$$

a standard transformation technique shown in the text, "Current Flow in Rectangular Conductors," by H. F. Moulton, London Flow in Rectangular Conductors," by H. F. Moulton, London Mathematical Society Proceedings, series 2, volume III, pp. 104–110, January 1905. The point $\mu = \lambda_{1/2}$ is determined by letting $Z = \gamma$ to obtain $$\frac{1}{\lambda^2} = \frac{\delta - \beta}{\beta - \alpha} \cdot \frac{\gamma - \alpha}{\delta - \lambda} \qquad (7)$$

Figure 6G:
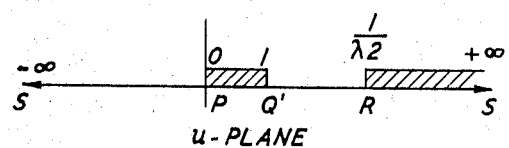

The points P, Q, R and S transformed in the u-plane in both cases are shown in FIGS. 6C and 6G. Finally, transformation from the u-plane to the v-plane is effected by applying the inverse elliptic sine function transformation $$u = sn^2(v, \lambda) \qquad (8)$$

Figure 6H:
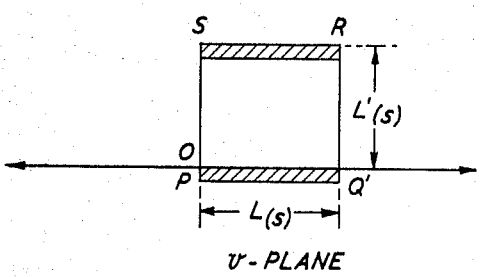

The graphical result of the foregoing transformations is the plot of the triangles of FIGS. 6A and 6E in the v-plane as shown in FIGS. 6D and 6H. The geometric resistance (equivalent number of squares) between the tabs PQ and RS of the open-circuited half, FIG. 5B, is given by $L'_{(o)}/L_{(o)}$ where $L_{(o)}$ is the complete integral of the first kind modulus $\lambda$ and $L'_{(o)}$ is its complement. Following exactly the same procedure, the geometric resistance between the tabs PQ' and RS of the short-circuited half of FIG. 6E can be obtained. After $Z_{1/2 \text{ o.c.}}$ and $Z_{1/2 \text{ s.c.}}$ are determined, z-parameters of the triangular network of FIG. 5A are obtained from Equations 3 and 4:

$$z_{11} = z_{22} = \tfrac{1}{2}(Z_{1/2 \text{ o.c.}} + Z_{1/2 \text{ s.c.}}) \qquad (9)$$

$$z_{12} = \tfrac{1}{2}(Z_{1/2 \text{ o.c.}} - Z_{1/2 \text{ s.c.}}) \qquad (10)$$

As a result, the triangular network of FIG. 7A, also denoted as Case I, is completely and precisely characterized in accordance with the invention and consequently, it is shown to be electrically equivalent to a conventional discrete element network. The $Z_{1/2 \text{ o.c.}}$ and $Z_{1/2 \text{ s.c.}}$ (or the z-parameters of the other two triangular networks shown in FIGS. 7B and 7C, denoted Case II and Case III, respectively, can be similarly obtained.

Synthesis of the triangular network

The synthesis of a triangular network in accordance with the invention involves finding a triangular network with the proper resistivity, tab size and location for a given set of z-parameters, $z_{11} = (z_{22}) z_{12}$.

From Equations 3 and 4 it may be observed that for a given set of z-parameters $z_{11} = z_{22}$, $z_{12}$, the $Z_{1/2 \text{ o.c.}}$ and $Z_{1/2 \text{ s.c.}}$ are uniquely determined. Accordingly, the problem may be restated as that of finding a set $(m, n)$ where $m$ and $n$ are the ratios of tab length to triangular side length, as indicated in FIGS. 7A through 7C, for a specific set of half-circuit impedances, $Z_{1/2 \text{ o.c.}}$ and $Z_{1/2 \text{ s.c.}}$. The method is as follows: The first step is to find a set $(m, n)$ which gives an approximate value of one of the two impedance values, $Z_{1/2 \text{ o.c.}}$ or $Z_{1/2 \text{ s.c.}}$, for instance, $Z_{1/2 \text{ o.c.}}$. Next, vary one of the two parameters, $m$ or $n$, a small amount. Next, employ an iterative process, best carried out with the aid of a computer, to determine the value of the other parameter such that $Z_{1/2 \text{ o.c.}}$ returns to its original value, and record the value of $Z_{1/2 \text{ s.c.}}$. Continue this iterative process until the desired values of $Z_{1/2 \text{ o.c.}}$ and $Z_{1/2 \text{ s.c.}}$ are simultaneously reached.

To determine a set of initial values of $m$, $n$ from a given set of $Z_{1/2 \text{ o.c.}}$ and $Z_{1/2 \text{ s.c.}}$, the variations of $Z_{1/2 \text{ o.c.}}$ and $Z_{1/2 \text{ s.c.}}$ of the three triangular networks, designated Case I, II and III as shown in FIGS. 7A, 7B and 7C, versus tab positions and tab size variations can be readily obtained for the following six Subcases:

Subcase Tab restrictions
 (1) P fixed, R variable, tab S–V absent ($m=0.1$).
 (2) R fixed, P variable, tab S–U absent ($n=0.1$).
 (3) P fixed, U variable, tab S–R absent ($m=0.1$).
 (4) U fixed, P variable, tab S–R absent ($n=0.1$).
 (5) P fixed, U and R variable ($m=0.1$).
 (6) U and R fixed, P variable ($n=0.1$).

The coordinates of the points P, R and U and the identity of the tabs SU, SR and PQ are shown in FIGS. 7A through 7C. Note that several other Subcases not included in the above six Subcases, such as "P and U fixed, R variable," may also be employed.

Two-port networks, in accordance with the invention, with various tab sizes and tab positions or attenuators using such networks may readily be designed or synthesized following the design procedure indicated above. Straightforward computer techniques may be employed to assist in the iterative processes involved. A specific example will serve to illustrate the method.

Figure 8:
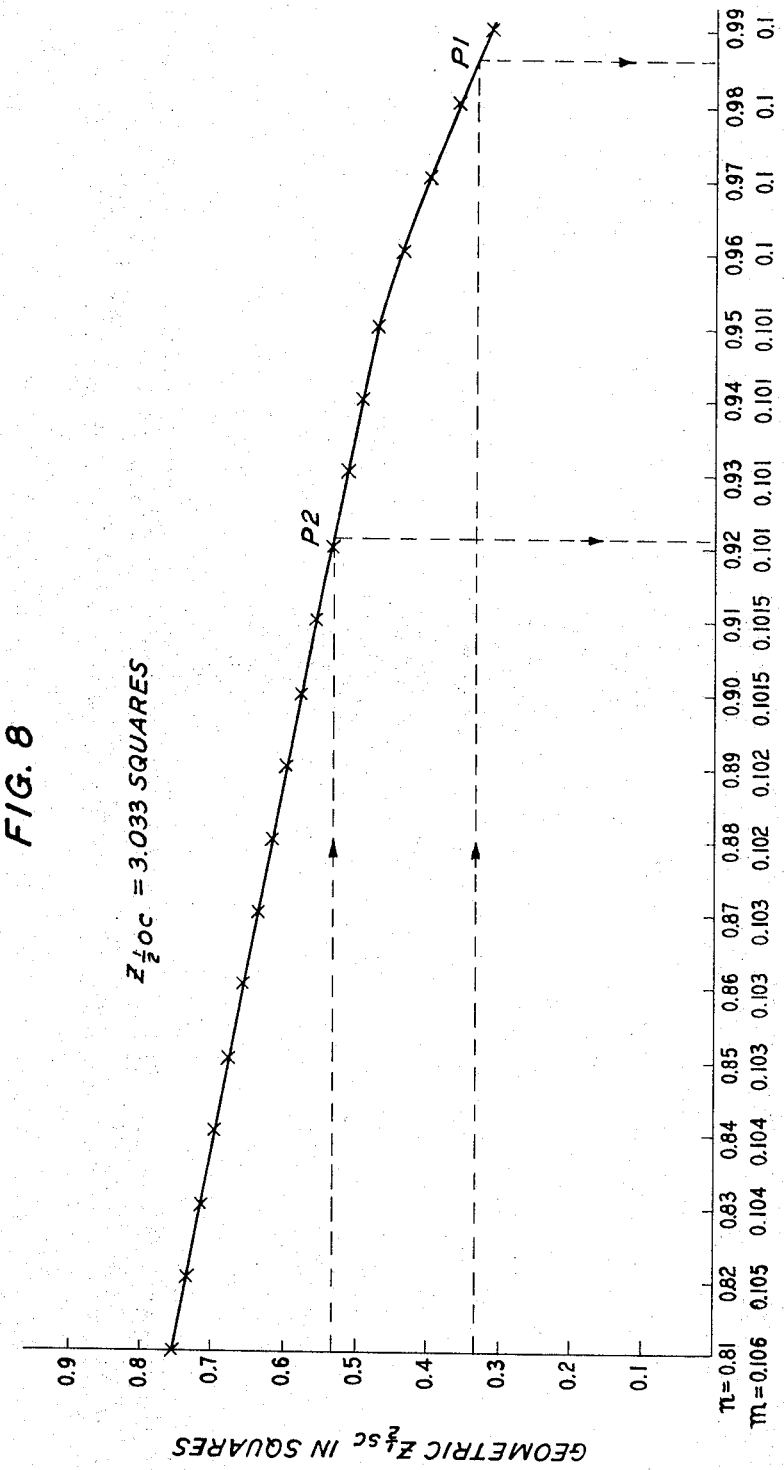
FIG. 8 is a plot of geometric resistance in squares versus circuit tab proportion factors $m$ and $n$ derived in accordance with the invention.
Figure 9:
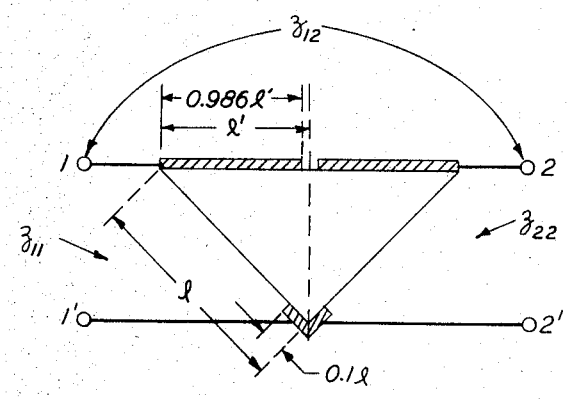
FIG. 9 is a sketch of a triangular network realization in accordance with the invention.

Assume, for example, that it is desired to find an isoceles triangle attenuator including a right-angle realizing $z_{11}(=z_{22})=252.56$ ohms and $z_{12}=202.56$ ohms. From Equations 3 and 4 it is determined that $Z_{1/2 \text{ o.c.}}$ and $Z_{1/2 \text{ s.c.}}$ are 455.12 ohms and 56.06 ohms respectively. Assume a resistive material with a resistivity $\rho$ of 150 ohms squares is to be used. Then the geometric resistance $Z_{1/2 \text{ o.c.}} = 455.12/\rho = 3.033$ squares and $$Z_{1/2 \text{ s.c.}} = 50.06/\rho = 0.333$$

squares. It is found that the desired conditions may be met by employing the Case III triangle (FIG. 7C), with P fixed and R variable (Subcase 1). When $m=0.1$ and $n=0.99$, $Z_{1/2 \text{ o.c.}}$ and $Z_{1/2 \text{ s.c.}}$ are found from analysis to be 3.028 squares and 0.3124 squares, respectively. Therefore, it is evident that the values of $m$ and $n$, which give the desired values of $Z_{1/2 \text{ o.c.}}$ and $Z_{1/2 \text{ s.c.}}$, are in the general neighborhood of $m=0.1$ and $n=0.99$, respectively. A plot of $Z_{1/2 \text{ s.c.}}$ versus $m$ and $n$ obtained from varying $m$ and $n$ and keeping $Z_{1/2 \text{ o.c.}} = 3.033$ squares is shown in FIG. 8. If one draws a horizontal line at $Z_{1/2s.c.}=0.333$ squares, it intersects the curve $$Z_{1/2o.c.}=3.033$$

squares at $P_1$. Accurate design requires that the increments of $m$ and $n$ be very small, and a digital computer may be employed to advantage to obtain these values precisely. It is found that at $P_1$, both $Z_{1/2o.c.}$ and $Z_{1/2s.c.}$ meet the specification. The corresponding values of $m$ and $n$ are $m=0.1$ and $n=0.986$. A sketch of the resulting network is shown in FIG. 9.

Synthesis of the triangular attenuator

Just as with rectangular networks, triangular networks can also be employed to design resistive attenuators. The triangular attenuator design follows directly from the triangular network design discussed above except that the attenuator is not characterized by z-parameters, but, instead, by insertion loss and image impedance (assuming the attenuator is designed on an image-impedance basis). The insertion loss ($I_L$) and image impedance ($Z_I$) may be calculated from Equations 11 and 12.

$$Z_I \sqrt{Z_{1/2\cdot o.c.} \cdot Z_{1/2\cdot s.c.}} \qquad (11)$$

$$I_L = 10 \log_{10} \left[ \frac{Z_{1/2\cdot o.c.} + Z_{1/2\cdot s.c.} + 2\sqrt{Z_{1/2\cdot o.c.} Z_{1/2\cdot s.c.}}}{Z_{1/2\cdot o.c.} + Z_{1/2\cdot s.c.} - 2\sqrt{Z_{1/2\cdot o.c.} Z_{1/2\cdot s.c.}}} \right] \qquad (12)$$

The plots of insertion loss and image impedance of the six Subcases versus $m$ and $n$ can also be easily obtained by an iterative process, which may be carried out advantageously with a computer. Such plots provide information for determining a set of initial values of $m$ and $n$ from a given insertion loss and image impedance.

Figure 11:
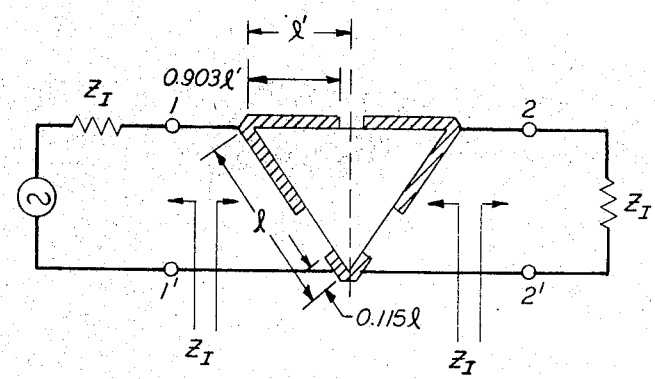
FIG. 11 is a schematic circuit diagram including a triangular attenuator realization in accordance with the invention.
Figure 10:
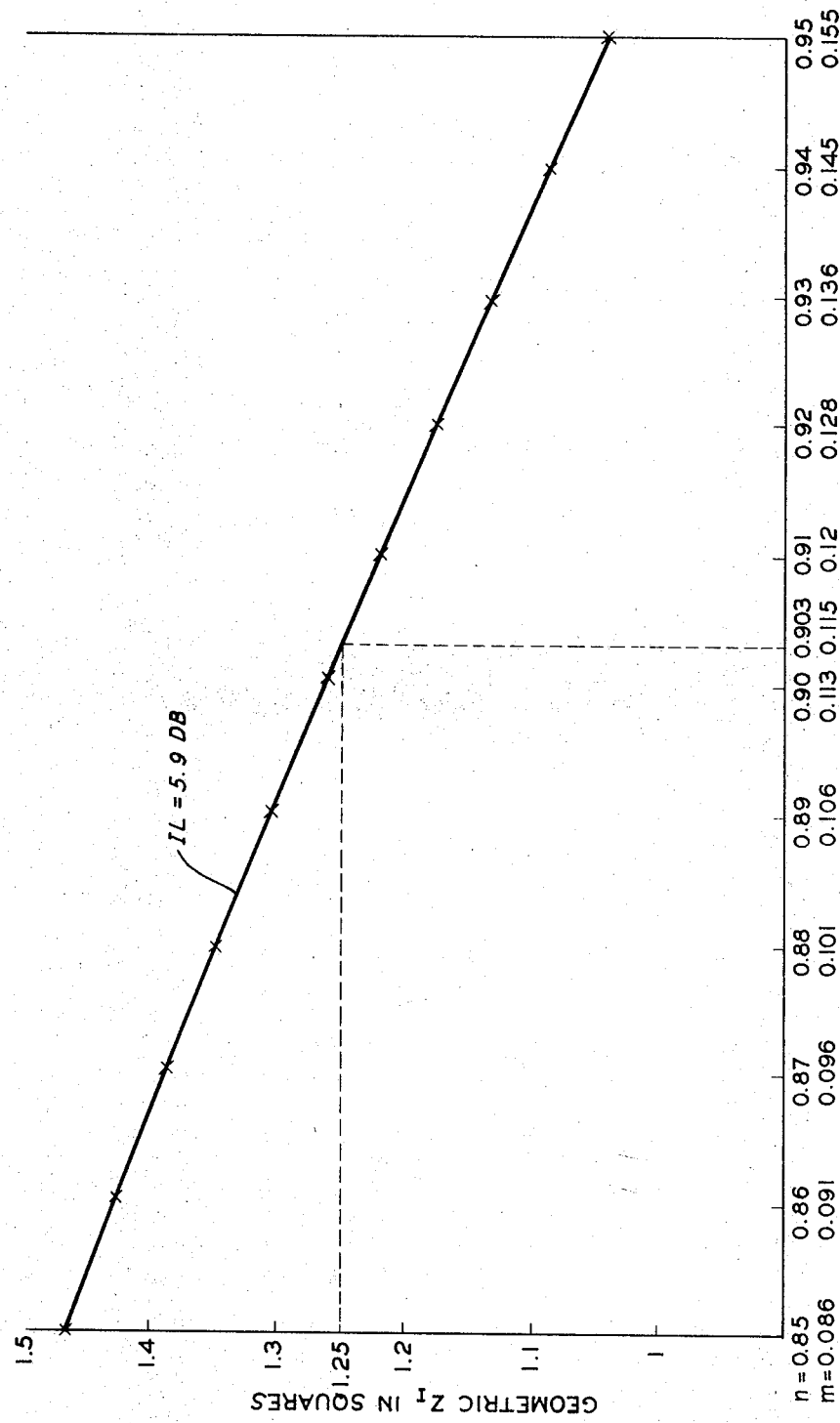
FIG. 10 is a plot of geometric resistance in squares versus circuit tab proportion factors $m$ and $n$ derived in acordance with the invention.

A specific example will serve to illustrate the method outlined immediately above. Assume that an unbalanced symmetrical tirangular monolithic resistance network is required to operate with an insertion loss of 5.9 db between impedance of 75 ohms. Assume further that any tab size will be suitable and that a resistivity of 60 ohms/squares is employed. Assume next that the equilateral triangular network (Case III, FIG. 7C) is chosen with the tab restrictions of Subcase (5). With $\rho=60$ ohms/square, one finds that $Z_I$ corresponds to $75/\rho=1.25$ squares. It is found that at $m=0.1$ and $n=0.85$, the insertion loss is 5.9 db and the geometric image impedance is 1.425 squares. As in the first example, a curve of $Z_I$ versus $m$ and $n$ is plotted with insertion loss equal to 5.9 db. Such a curve is shown in FIG. 10. The point of interest where $Z_I=1.25$ squares for 5.9 db requires that $n=0.903$ and $m=0.115$. A sketch and schematic circuit diagram of the network realization is shown in FIG. 11.

The rhomboid and "V" networks

Figure 12A:
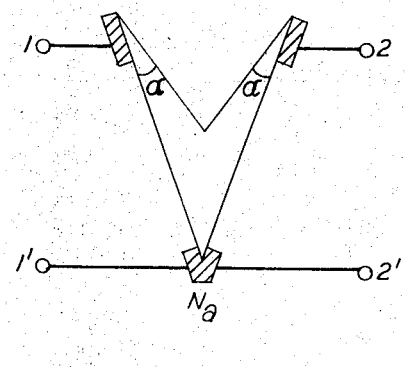
FIG. 12A is a schematic circuit diagram of a "V" network in accordance with the invention.
Figure 12B:
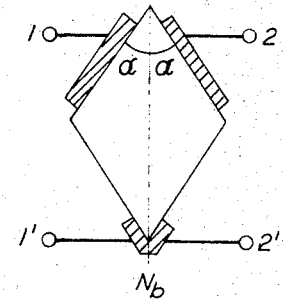
FIG. 12B is a schematic circuit diagram of a rhomboid network in acordance with the invention.

As indicated above, the principles of the invention are not restricted solely to triangular network configurations of the type discussed but instead may be applied also to two other cases of symmetrical monolithic resistance networks whose open- and short-circuited halves are one of the four triangles listed in the table of FIG. 22 with known closed for form Schwartz-Christoffel transformations. Typical networks of this type are shown in FIGS. 12A and 12B. FIG. 12A shows the "V" network $N_A$ and FIG. 12B shows the rhomboid network $N_B$.

Figure 13:
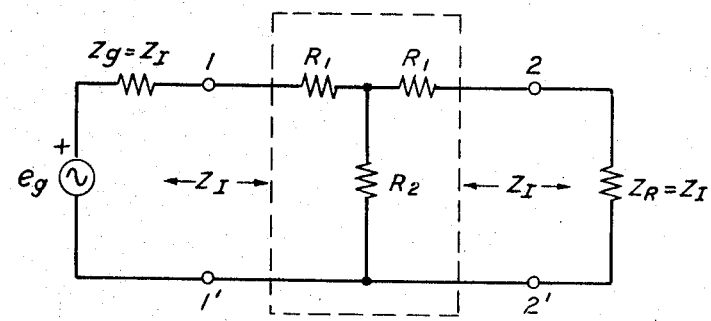
FIG. 13 is a schematic circuit diagram of a T-equivalent circuit of the circuits shown in FIGS. 12A and 12B.

By way of example, assume that the two resistance attenuators $N_A$ and $N_B$ of FIGS. 12A and 12B are employed in designing attenuators which are to be operated on an image-impedance basis. It is known that every common-grounded two-port network has a T-equivalent network. Let the T network $N_C$ of FIG. 13 represent the T-equivalent of the networks $N_A$ and $N_B$. In the network $N_C$, series arms are denoted by the resistors $R_1$–$R_1$ and the shunt arm by resistor $R_2$. The following relations are obvious:

$$R_1 = Z_{1/2s.c.} \qquad (13)$$

$$R_2 = \frac{Z_{1/2\ o.c.} - Z_{1/2\ s.c.}}{2} \qquad (14)$$

From the configuration of the "V" network $N_A$ and of the rhomboid network $N_B$ it is evident by inspection that $Z_{1/2\ o.c.} > Z_{1/2\ s.c.}$ for any tab size. This relation implies that both resistors $R_1$ and $R_2$ of network $N_C$ are positive and thus realizable. By employing the identities shown in the text, "Transmission Lines and Networks" by W. C. Johnson, McGraw-Hill, New York, 1950, page 288, it can be shown that $$R_1 = Z_I \cdot \left( \frac{e^\theta - 1}{e^\theta + 1} \right) \qquad (15)$$

and $$R_2 = 2Z_I \cdot \left( \frac{e^\theta}{e^{2\theta} - 1} \right) \qquad (16)$$

where $\theta$ is the image attenuation constant in nepers. From Equations 13 and 14 one obtains $$\frac{R_1}{R_2} = \frac{1}{2} \left[ e^{\frac{\theta}{2}} - e^{-\frac{\theta}{2}} \right]^2 \qquad (17)$$

Equation 17 indicates that the insertion loss is small if the ratio $R_1/R_2$ is small. On the other hand, if the ratio $R_1/R_2$ is large, then the insertion loss will be large.

From Equations 13 and 14 it may be concluded that in designing a high insertion loss attenuator the values of $Z_{1/2\ o.c.}$ and $Z_{1/2\ s.c.}$ must be close to each other, whereas in designing a low insertion loss attenuator, the opposite relation is required, i.e., $Z_{1/2\ o.c.} \gg Z_{1/2\ s.c.}$. From an examination of the two networks $N_A$ and $N_B$ (FIGS. 12A and 12B) it is apparent that network $N_A$ is a relatively high insertion loss attenuator and that the network $N_B$ is a relatively low insertion loss attenuator. If one defines the angle $\alpha$ shown in FIGS. 12A and 12B as the index of the network, it can be shown that the insertion loss of the network $N_A$ is inversely proportional to the index $\alpha$ and the insertion loss of the network $N_B$ is directly proportional thereto. Inasmuch as rhomboid and "V" networks are closely similar from the standpoint of the inventive concept disclosed herein, an example of the synthesis process for a rhomboid network will also be illustrative for the same process in a "V" network.

Figure 14A:
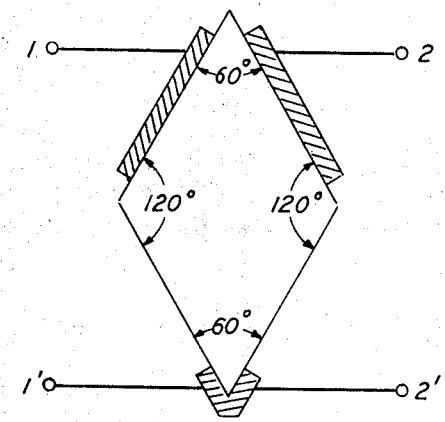
FIG. 14A is a schematic circuit diagram of a rhomboid network in accordance with the invention.
Figure 14B:
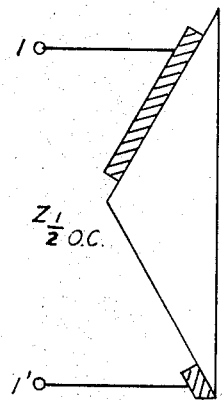
FIG. 14B is a schematic circuit diagram of the open-circuited half of the network of FIG. 14A.
Figure 14C:
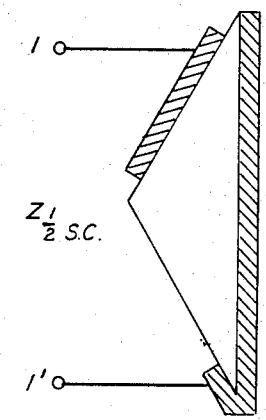
FIG. 14C is a schematic circuit diagram of the short-circuited half of the network shown in FIG. 14A.
Figure 15:
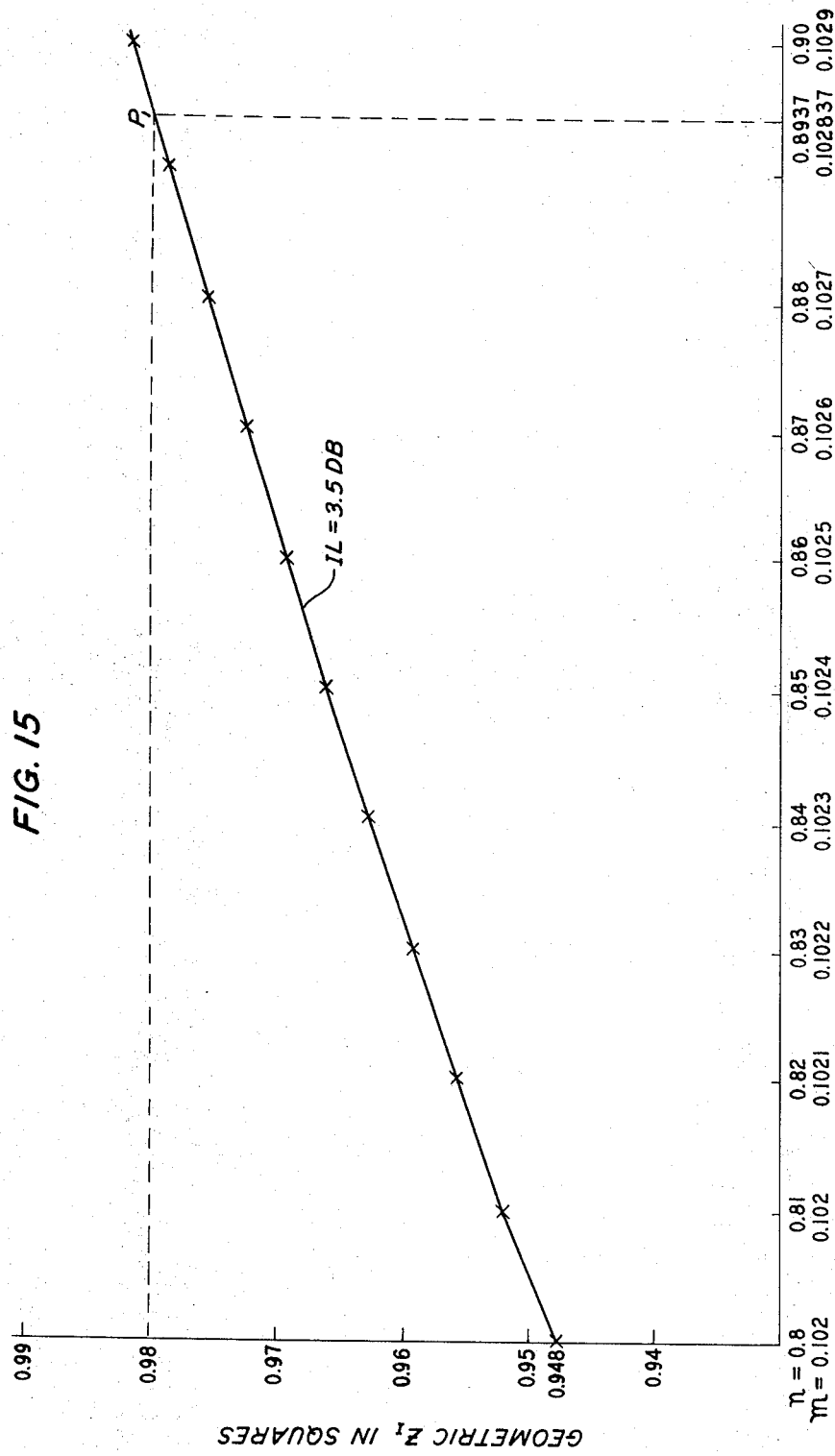
FIG. 15 is a plot of geometric resistance in squares versus tab proportion factors $m$ and $n$ for a rhomboid network in accordance with the invention.

As indicated, the insertion loss of the rhomboid network $N_A$ is proportional to the angle $\alpha$. Theoretically, one can obtain a very low insertion loss rhomboid attenuator by making the angle $\alpha$ very small. If $\alpha$ is very small, however, only experimental or inexact results may be obtained owing to the fact that explicit Schwarz-Christoffel transformations for triangles with arbitrary angles $\alpha$ are unknown. In accordance with the invention, exact solutions for rhomboid networks require one of the special angles $\alpha$ (30°, 45°, and 60°). A rhomboid network with a "special case" $\alpha$ (60°) is shown by way of example in FIG. 14A. The associated open-circuited half and short-circuited half networks are shown in FIGS. 14B and 14C respectively. The synthesis of the rhomboid network may be carried out by substantially the same procedure as that shown above in the illustrative synthesis of a triangular network. If, for example, it is desired to design a rhomboid attenuator with $I_L=3.5$ db and $Z_I=0.98$, a solution is provided by employing the curve shown in FIG. 15 where it is found that $m=0.1028$ and $n=0.8937$.

A digital-to-analog decoder using triangular networks

Up to this point distributed resistance networks in accordance with the invention have been discussed in terms of their equivalency to certain limited lumped element networks such as T networks for example. The principles of the invention, however, are equally applicable to the analysis and synthesis of combinations of individual triangular, rhomboid or "V" distributed resistance networks which may be employed in lieu of rather complex lumped element resistance networks, such as the lumped ladder network shown in FIG. 16A. Networks of this type are well known in the art and may be employed, for example, as digital-to-analog decoders in pulse code modulation (PCM) systems. It is evident that the ladder network shown in FIG. 16A may be rearranged to form the equivalent circuit shown in FIG. 16B which is a cascade of eight $\pi$ sections or subnetworks denoted by I through VIII.

Figure 16A:
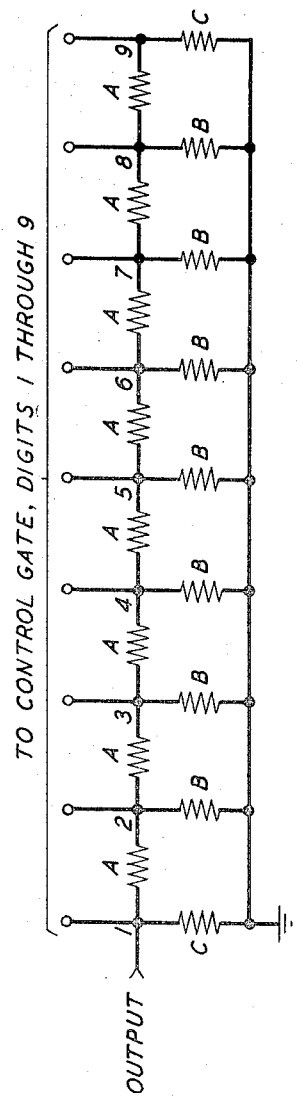
FIG. 16A is a schematic circuit diagram of a lumped resistance ladder network.
Figure 17A:
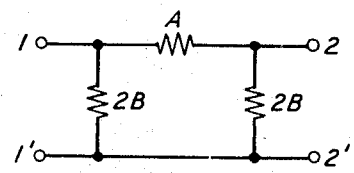
FIG. 17A is a schematic circuit diagram of one of the subnetworks shown in FIG. 16B.
Figure 17B:
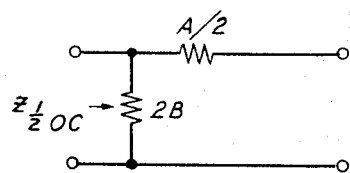
FIG. 17B is a schematic circuit diagram of the open-circuited half of the subnetwork of FIG. 17A.
Figure 17C:
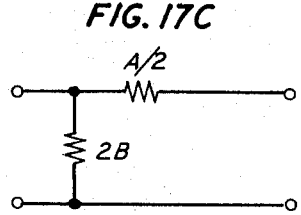
FIG. 17C is a schematic circuit diagram of the short-circuited half of the network of FIG. 17A.

The subnetworks II through VII of FIG. 16A have the same form as the isolated subnetwork shown in FIG. 17A which is a physically symmetrical network. The open-circuited half and short-circuited half of the subnetwork shown in FIG. 17A are shown in FIGS. 17B and 17C respectively. Employing the resistance magnitudes indicated in FIG. 16A, $Z_{1/2\ o.c.}$ and $Z_{1/2\ s.c.}$ may readily be computed as 455.12 ohms and 50.06 ohms respectively. If a resistive film with $\rho=150$ ohms/square is used, then $Z_{1/2\ o.c.}=455.12/\rho=3.03$ squares and $$Z_{1/2\ s.c.}=50.06/\rho=0.333$$

square. If the isoceles right-angled triangular network of Case III is used with the tab conditions of Subcase (1), the same solution arrived at above in connection with the discussion of FIG. 9 is obtained, i.e., $m=0.1$ and $n=0.986$.

Figure 16B:
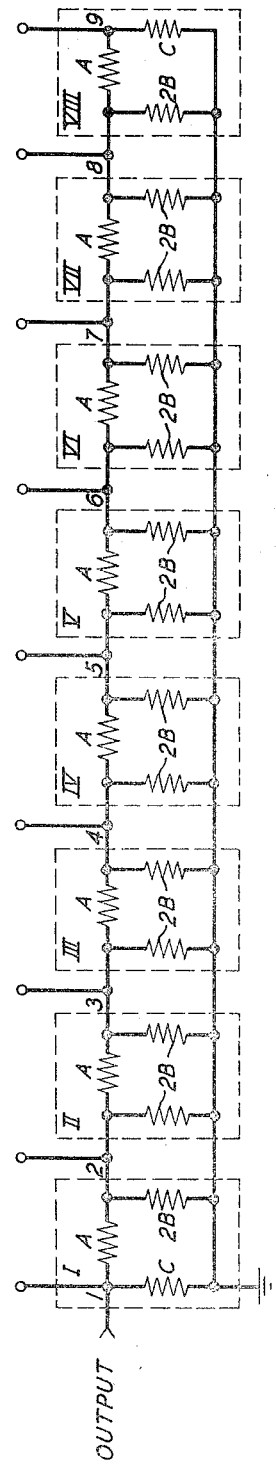
FIG. 16B is a modified schematic circuit diagram of the circuit shown in FIG. 16A.
Figure 18A:
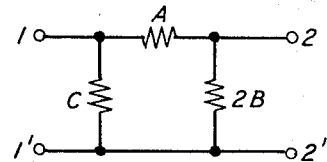
FIG. 18A is a schematic circuit diagram of one of the subnetworks of FIG. 16B.
Figure 18B:
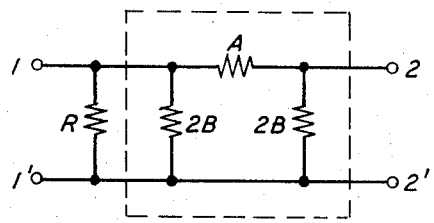
FIG. 18B is a schematic circuit diagram of the subnetwork shown in FIG. 18A modified in accordance with the invention.

Consider now the network shown in FIG. 18A which is merely the subnetwork I or the subnetwork VIII of FIG. 16B. The network of FIG. 18A may be rearranged into the equivalent network shown in FIG. 18B. It is seen that the network shown in the dotted frame in FIG. 18B is identical to the subnetworks II through VII of FIG. 16B. Accordingly, it is evident that the subnetworks I and VIII of FIG. 16B may be realized by a lumped resistor R in parallel with the triangular network shown in FIG. 9. If a resistive film with $\rho=150$ ohms/square is used to build the network, it is found that the geometric resistance R is $146.97/150=0.9798$ squares.

Figure 19A:
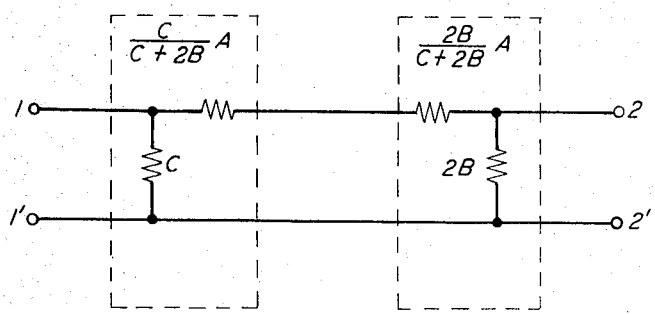
FIGS. 19A through 19D are schematic circuit diagrams of a part of the network of FIG. 18A variously arranged to illustrate the application of Bartlett's bisection theorem in accordance with the principles of the invention.
Figure 19B:
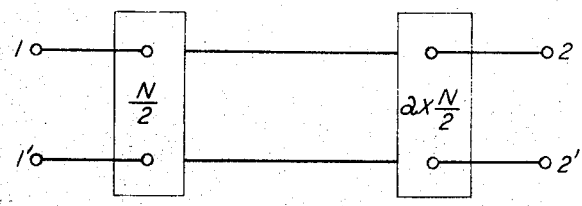

Another approach for the design of triangular networks in accordance with the invention equivalent to the subnetworks I and VIII of FIG. 16B may be employed based in part on the realization that the network shown in FIG. 18A is "potentially symmetrical." A network is said to be "potentially symmetrical" if there exists a positive number "$a$" such that by raising the impedance level of one of the network halves by "$a$" the resulting network is a symmetrical network. In this instance, "$a$"=4.02. The network of FIG. 18A may be redrawn in the form shown in FIG. 19A which in turn may be shown in block form as illustrated in FIG. 19B. The $Z_{1/2\ o.c.}$ and $Z_{1/2\ s.c.}$ of the open-circuited half and short-circuited half (FIGS. 19C and 19D) are $Z_{1/2\ o.c.}=C=113.14$ ohms and $$Z_{1/2\ s.c.}=\frac{C \cdot A_1}{C+A_1}=19.8$$

ohms where $$A_1=\frac{C}{2B+C}A=24\text{ ohms}$$

Figure 19C:
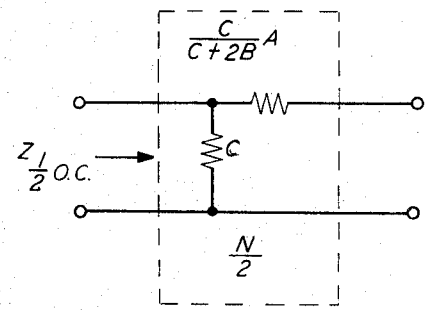
Figure 19D:
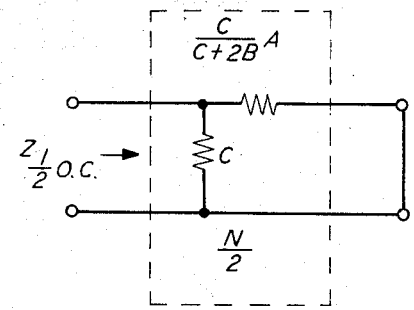
Figure 20:
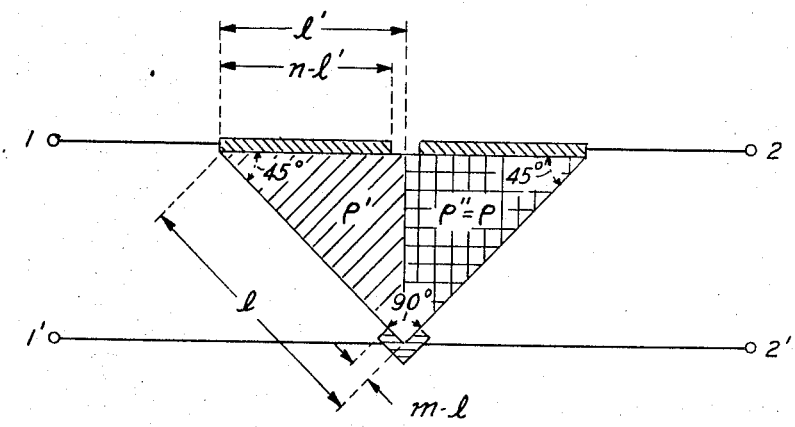
FIG. 20 is a sketch of a triangular network realization of subnetworks I and VIII of FIG. 16A by the method illustrated in FIGS. 19A through 19D.

If a metal film with a resistivity $\rho'$ of $150/a=37.3$ ohms/square is employed to realize the network N/2 of FIG. 19C, then $Z_{1/2\ o.c.}=3.03$ squares and $Z_{1/2\ s.c.}=0.5308$ squares. If the same type of triangle and the same type of tab position is employed, a solution may be obtained from the plot of FIG. 8, yielding $m=0.101$ and $n=.92$. The final network realization is shown in FIG. 20. Since $\rho'$ was set equal to $\rho/a$, then $\rho''=a\rho'=\rho$. By employing the resistivity relationships indicated, it is found that only two kinds of metal film (each with a different resistivity) are required instead of three. It may be noted that both of the methods described above for synthesizing triangular networks equivalent to subnetworks I and VIII of FIG. 16B are exact synthesis methods.

Figure 21A:
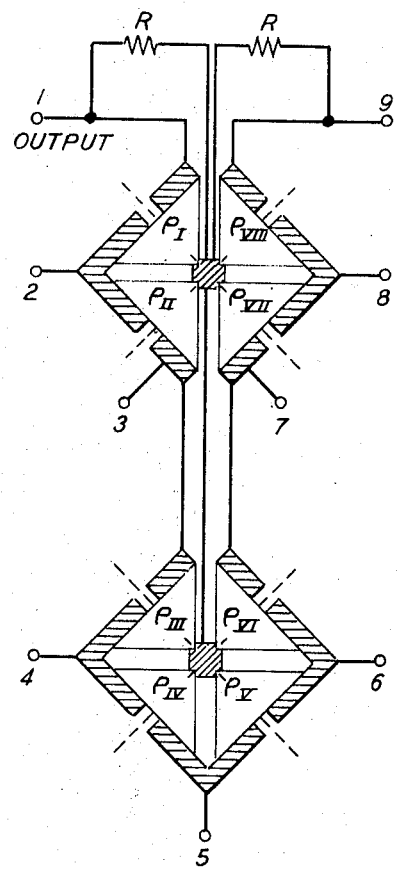
FIGS. 21A and 21B are schematic circuit diagrams of circuits employing a plurality of triangular networks in accordance with the invention, each being equivalent to the lumped resistance network of FIG. 16A.
Figure 21B:
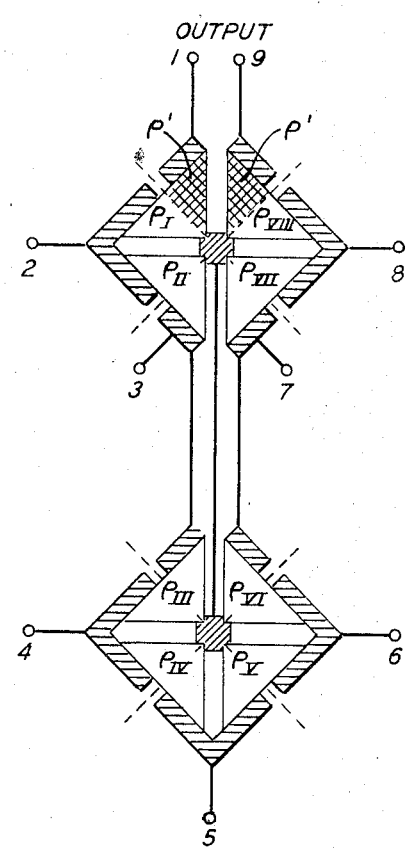

The alternative PCM decoder designs are shown in FIGS. 21A and 21B. The network of FIG. 21A requires only a single kind of resistive film of resistivity $\rho$, whereas the design of the network of FIG. 21B requires two kinds of resistive films $\rho$ and $\rho'$, but the two lumped resistors R—R are eliminated. The two halves of each network may be affixed to either of the two sides of a substrate or on a single side thereof. If the two halves are laid on opposite sides of the substrate, the connection between them may be plated through suitably positioned holes in the substrate. In both FIGS. 21A and 21B the terminal designations 1 through 9 and the network designations I through VIII correspond to like designations of the terminals and the networks shown in FIG. 16B.

It is to be understood that the embodiments disclosed herein are merely illustrative of the principles of the invention. Various modifications may be effected by persons skilled in the art without departing from the spirit and scope of the invention.

What is claimed is:

1. A three-terminal, two-port resistive network comprising, in combination,
   a substantially nonconductive substrate,
   a substantially triangularly shaped area of resistive film affixed to said substrate,
   each of said terminals comprising a respective conductive member affixed to a respective portion of the perimeter of said triangularly shaped area, whereby uniformity in current density and uniformity in power dissipation per unit area are achieved, thereby enhancing operational reliability and improving efficiency in the use of the area of said substrate.

2. Apparatus in accordance with claim 1 wherein said triangularly shaped area is a triangle having one of the following combinations of angles:

$$\pi/3,\ \pi/3,\ \pi/3$$
$$\pi/2,\ \pi/3,\ \pi/6$$
$$2\pi/3,\ \pi/6,\ \pi/6$$
$$\pi/2,\ \pi/4,\ \pi/4$$

thereby enhancing the accuracy of calculation-based selection of the size of said area and of the size and positioning of said conductive members which facilitates the attainment of preselected transmission characteristics for said network.

3. A three-terminal, two-port resistive network comprising, in combination,
   a substantially nonconductive substrate,
   a substantially triangularly shaped area of resistive film affixed to said substrate,
   said area having three sides and three vertices,
   each of said terminals comprising a respective conductive member affixed to a respective portion of the perimeter of said area,
   the particular location and length of each of said members being selected to ensure preselected impedance characteristics for said network, whereby uniformity in current density and uniformity in power dissipation per unit area are achieved, thereby enhancing operational reliability and improving efficiency in the use of the area of said substrate.

4. Apparatus in accordance with claim 3 wherein the angles of said vertices conform to one of the following combinations of angles:

$$\pi/3,\ \pi/3,\ \pi/3$$
$$\pi/2,\ \pi/3,\ \pi/6$$
$$2\pi/3,\ \pi/6,\ \pi/6$$
$$\pi/2,\ \pi/4,\ \pi/4$$

thereby enhancing the accuracy of calculation-based selection of the size of said area and of the size and precise positioning of said conductive members which facilitates the attainment of preselected transmission characteristics for said network.

5. Apparatus in accordance with claim 4 wherein each of said members surrounds a respective one of said vertices and is in conductive contact with the respective pair of said sides included in said last named vertex.

6. Apparatus in accordance with claim 4 wherein one of said members surrounds that one of said vertices corresponding to the common terminal of said network and wherein said last named member is in conductive contact with the respective pair of said sides included in said last named vertex.

7. Apparatus in accordance with claim 6 wherein each of the other two of said members is in contact only with a respective portion of that one of said sides opposite to said last named vertex.

8. Apparatus in accordance with claim 6 wherein each of the other two of said members is in contact only with a respective portion of a respective one of said sides other than the side opposite said common terminal,
   each of said last named portions being adjacent to a respective one of said vertices other than said vertex corresponding to said common terminal.

9. A three-terminal, two-port resistive network comprising, in combination,
   a substantially nonconductive substrate,
   a resistive film affixed to said substrate,
   the configuration of said film comprising two contiguous triangles with a common base, thereby to form a rhomboid,
   each of said terminals comprising a respective conductive member affixed to a respective portion of the perimeter of said rhomboid, whereby uniformity in current density and uniformity in power dissipation per unit area are achieved, thereby enhancing operational reliability and improving efficiency in the use of the area of said substrate,
   the particular location and length of each of said members being selected to ensure preselected impedance characteristics for said network.

10. Apparatus in accordance with claim 9 wherein the angles of each of said triangles conforms to one of the following groups of angles:

$$\pi/3, \pi/3, \pi/3$$
$$\pi/2, \pi/3, \pi/6$$
$$2\pi/3, \pi/6, \pi/6$$
$$\pi/2, \pi/4, \pi/4$$

thereby enabling accurate calculation-based selection of the size of said area and of the size and positioning of said conductive members which facilitates the attainment of preselected transmission characteristics for said network.

11. Apparatus in accordance with claim 10 wherein one of said members surrounds that vertex of said rhomboid corresponding to the common terminal of said network and wherein each of the other of said members is affixed to a respective portion of a respective one of the sides of said rhomboid opposite to said vertex corresponding to said common terminal.

12. A three-terminal, two-port resistive network comprising, in combination,
    a substantially nonconductive substrate,
    a resistive film affixed to said substrate,
    the configuration of said film comprising two contiguous triangles with a common side thereby to form a "V" shaped area,
    each of said terminals comprising a respective conductive member affixed to a respective portion of the perimeter of said "V" shaped area, whereby uniformity in current density and uniformity in power dissipation per unit area are achieved, thereby enhancing operational reliability and improving efficiency in the use of the area of said substrate,
    the particular location and length of each of said members being selected to ensure preselected impedance characteristics for said network.

13. Apparatus in accordance with claim 12 wherein the angles of each of said triangles conforms to one of the following groups of angles:

$$\pi/3, \pi/3, \pi/3$$
$$\pi/2, \pi/3, \pi/6$$
$$2\pi/3, \pi/6, \pi/6$$
$$\pi/2, \pi/4, \pi/4$$

thereby enhancing the accuracy of calculation-based selection of the size of said area and of the size and positioning of said conductive members which facilitates the attainment of preselected transmission characteristics for said network.

14. Apparatus in accordance with claim 13 wherein one of said members is affixed around the bottom vertex of said "V," said bottom vertex corresponding to the common terminal of said network, and wherein each of the other of said members is affixed to the outside top portion of a respective one of the arms of said "V."

References Cited

UNITED STATES PATENTS

| | | | |
|---|---|---|---|
| 3,217,276 | 11/1965 | Cooper et al. | 323—74 |
| 3,273,084 | 9/1966 | McSparran | 333—81 |
| 2,877,389 | 3/1959 | Wiener. | |
| 3,109,983 | 11/1963 | Cooper | 323—74 |

OTHER REFERENCES

Electronics, vol. 32, No. 36, pp. 44–49, article by Chas. Hager "Network Design of Microcircuits."

HERMAN K. SAALBACH, Primary Examiner

C. BARAFF, Assistant Examiner

U.S. Cl. X.R.

323—74; 328—333; 333—70; 338—309